(12) United States Patent
Byun et al.

(10) Patent No.: US 9,209,449 B2
(45) Date of Patent: Dec. 8, 2015

(54) RECHARGEABLE BATTERY WITH FUSE PART AND AUXILIARY DISCHARGE PATH

(75) Inventors: Sang-Won Byun, Yongin-si (KR);
Soo-Seok Choi, Yongin-si (KR);
Jeong-Won Oh, Yongin-si (KR);
Min-Yeol Han, Yongin-si (KR);
Hae-Kwon Yoon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 909 days.

(21) Appl. No.: 13/446,951

(22) Filed: Apr. 13, 2012

(65) Prior Publication Data

US 2013/0101870 A1    Apr. 25, 2013

(30) Foreign Application Priority Data

Oct. 25, 2011 (KR) .................. 10-2011-0109357

(51) Int. Cl.
| | |
|---|---|
| H01M 2/34 | (2006.01) |
| H01M 10/44 | (2006.01) |
| H01M 2/26 | (2006.01) |
| H01H 79/00 | (2006.01) |
| H01M 4/66 | (2006.01) |
| H01M 4/70 | (2006.01) |
| H01M 10/04 | (2006.01) |

(52) U.S. Cl.
CPC ............. *H01M 2/348* (2013.01); *H01M 2/26* (2013.01); *H01M 4/665* (2013.01); *H01M 10/443* (2013.01); *H01H 79/00* (2013.01); *H01M 2/263* (2013.01); *H01M 4/661* (2013.01); *H01M 4/70* (2013.01); *H01M 10/0431* (2013.01); *H01M 2200/103* (2013.01)

(58) Field of Classification Search
CPC .......... H01M 2200/103; H01M 2/263; H01M 2/348; H01M 2200/105; H01M 10/443; H01H 79/00
See application file for complete search history.

(56) References Cited

U.S. PATENT DOCUMENTS

| | | | | |
|---|---|---|---|---|
| 2002/0113685 | A1* | 8/2002 | Izaki et al. .................... | 337/405 |
| 2003/0027036 | A1* | 2/2003 | Emori et al. .................... | 429/61 |
| 2004/0266951 | A1* | 12/2004 | Akiyama et al. .............. | 525/191 |
| 2010/0108291 | A1* | 5/2010 | Onnerud et al. ............. | 165/80.2 |

(Continued)

FOREIGN PATENT DOCUMENTS

| | | |
|---|---|---|
| EP | 0 964 419 A1 | 12/1999 |
| JP | 2004-111186 | 4/2004 |

(Continued)

OTHER PUBLICATIONS

European Search Report dated Feb. 26, 2013, for corresponding European Patent application 12170240.1, (5 pages).

(Continued)

*Primary Examiner* — Zachary Best
(74) *Attorney, Agent, or Firm* — Christie, Parker & Hale, LLP

(57) ABSTRACT

A rechargeable battery including an electrode assembly including a first electrode, a second electrode, and a separator between the first and second electrodes; a case housing the electrode assembly; a cap plate covering an opening of the case; an electrode terminal extending through the cap plate; a lead tab including a fuse part and connecting the electrode terminal and the electrode assembly; and an auxiliary discharge path between opposite sides of the fuse part and having a second electrical resistance value greater than a first electrical resistance value of the fuse part.

14 Claims, 6 Drawing Sheets

(56) References Cited

U.S. PATENT DOCUMENTS

2011/0052949 A1* 3/2011 Byun et al. .................. 429/61
2011/0177387 A1   7/2011 Byun et al.
2011/0183197 A1   7/2011 Byun et al.

FOREIGN PATENT DOCUMENTS

| KR | 10-1998-0035976 U | 9/1998 |
| KR | 10-2007-0111131 A | 11/2007 |
| KR | 10-2011-0084079 A | 7/2011 |
| KR | 10-2011-0087567 A | 8/2011 |

OTHER PUBLICATIONS

Patent Abstracts of Japan, and English machine translation of Japanese Publication 2004-111186 listed above, (15 pages).

* cited by examiner

RECHARGEABLE BATTERY WITH FUSE PART AND AUXILIARY DISCHARGE PATH

CROSS-REFERENCE TO RELATED APPLICATION

This application claims priority to and the benefit of Korean Patent Application No. 10-2011-0109357, filed on Oct. 25, 2011 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery can repetitively perform charge and discharge, unlike a primary battery. A small-capacity rechargeable battery is commonly used with a portable compact electronic device, such as a mobile phone, a laptop computer, or a camcorder, and a large-capacity rechargeable battery is widely used as a motor-driving power supply, such as for driving a motor of a hybrid vehicle or an electric vehicle.

Recently, a high-power rechargeable battery using a non-aqueous electrolyte having a high energy density has been developed. The high-power rechargeable battery is configured by connecting a plurality of rechargeable batteries in series and may be used for devices requiring a large amount of power, such as a motor drive of an electric vehicle and the like.

The rechargeable battery includes an electrode assembly including a positive electrode and a negative electrode at both sides of a separator, a case housing the electrode assembly, a cap plate sealing an opening of the case, and electrode terminals installed through the cap plate to be electrically connected to the electrode assembly.

Since charging and discharging are repeated in the rechargeable battery, excessive heat may be generated from the inside of the case, or an electrolyte solution may be decomposed. The heat generation or decomposition of the electrolyte solution may cause the internal pressure of the rechargeable battery to be increased. The increase in internal pressure may cause the rechargeable battery to ignite or explode.

In order to prevent fire and/or explosion caused by the increase in internal pressure, an external short-circuit part may be provided outside the case. The external short-circuit part short circuits the negative electrode and the positive electrode of the electrode assembly with each other outside the rechargeable battery when the internal pressure of the rechargeable battery increases. When the external short-circuit part performs a short circuit operation, a charging state of the electrode assembly is decreased due to discharge of a large current. A weak part of a discharge line connecting the electrode assembly and the electrode terminal may be melted and broken due to the discharge of the large current.

In order to effectively disconnect the discharge line in an external short circuit or overcharge, a fuse part may be provided at a lead tab connecting the electrode terminal and the electrode assembly in the rechargeable battery. However, the fuse part is melted and broken and thereafter, when a broken portion is small, an arc may be generated at the broken portion.

An arc generated in the rechargeable battery may act on the electrolyte solution to cause fire or explosion, thereby deteriorating stability of the rechargeable battery.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery is configured to prevent or substantially prevent arc generation in a fuse part after the fuse part is disconnected.

According to an exemplary embodiment of the present invention, a rechargeable battery includes: an electrode assembly including a first electrode, a second electrode, and a separator between the first and second electrodes; a case housing the electrode assembly; a cap plate covering an opening of the case; an electrode terminal extending through the cap plate; a lead tab including a fuse part and connecting the electrode terminal and the electrode assembly; and an auxiliary discharge path between opposite sides of the fuse part and having a second electrical resistance value greater than a first electrical resistance value of the fuse part.

The auxiliary discharge path may be configured to electrically insulate between the opposite sides of the fuse part when the rechargeable battery is in a normal state and electrically conduct between the opposite sides of the fuse part when the rechargeable battery is in a short-circuited state.

The lead tab may include a first connection part connected to the electrode terminal and a second connection part connected to the electrode assembly, and the fuse part may be at the first connection part.

The auxiliary discharge path may be formed by an insert injection part formed by insert-injecting the fuse part of the lead tab.

The auxiliary discharge path may be further formed by an insulation member insulating the insert injection part and the lead tab from an inner surface of the cap plate.

At least one of the insert injection part and the insulation member may be formed of polypropylene (PP) of 70 to 90 wt % and carbon of 10 to 30 wt %.

At least one of the insert injection part and the insulation member may be formed of polyphenylenesulfide (PPS) of 70 to 90 wt % and carbon of 10 to 30 wt %.

The auxiliary discharge path may be formed by an insulation member insulating the lead tab from an inner surface of the cap plate.

The auxiliary discharge path may be formed of a material having an electrical resistivity of 10 to $1*10^6$ ohm*cm.

The auxiliary discharge path may be formed by a connection member connecting the opposite sides of the fuse part of the lead tab.

The lead tab may be made of aluminum or copper, and the connection member may be made of stainless steel.

The electrode terminal may include a negative terminal installed in an insulation structure at the cap plate and a positive terminal installed in an electric-conduction structure at the cap plate, and the fuse part may be formed at the lead tab connected to the positive terminal.

The auxiliary discharge path may connect the opposite sides of the fuse part to the positive terminal.

The rechargeable battery may be adapted for use as a motor-driving power source for propelling an electric vehicle or a hybrid electric vehicle.

According to an aspect of embodiments of the present invention, a discharging path is formed through a fuse part by a high electrical resistance value of an auxiliary discharge path in a normal operation state by connecting opposite sides of the fuse part provided at a lead tab to the auxiliary discharge path, and a high-voltage current is discharged to the auxiliary discharge path after the fuse part is broken by an external short circuit, such that an arc is prevented or substantially prevented from occurring in the fuse part. As such, a rechargeable battery according to embodiments of the present invention is particularly suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

Figure 1:
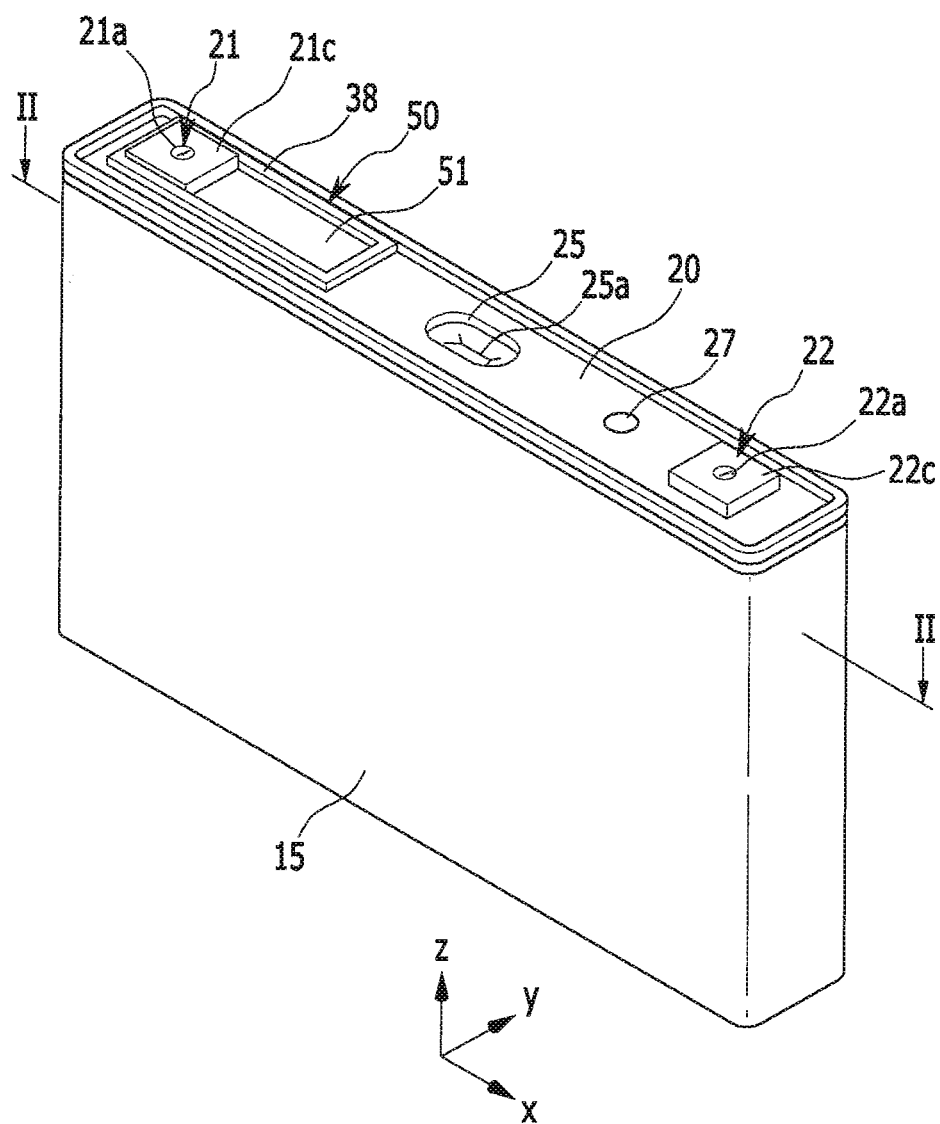
FIG. 1 is a perspective view of a rechargeable battery according to an exemplary embodiment of the present invention.

| Description of Reference Numerals Indicating Some Elements in the Drawings | |
|---|---|
| 10: Electrode assembly | 11: First electrode (negative electrode) |
| 11a, 12a: Coated region | 11b, 12b: Uncoated region |
| 12: Second electrode (positive electrode) | 13: Separator |
| 15: Case | 20: Cap plate |
| 21: First terminal (negative terminal) | 21a, 22a: Rivet terminal |
| 21b, 22b: Flange | 21c, 22c: Plate terminal |
| 22: Second terminal (positive terminal) | 23: Short-circuit hole |
| 24: Vent hole | 25: Vent plate |
| 25a: Notch | 27: Sealing cap |
| 29: Electrolyte injection opening | |
| 31, 32: First and second electrode lead tab | |
| 36, 37: First and second gasket | 38: Insulation member |
| 41, 42: First and second insulation member | 50: External short-circuit part |
| 51: Short-circuit tab | 53: Short-circuit member |
| 60: Fuse part | 61: Insert injection part |
| 62: Connection member | 311, 312: Terminal hole |
| 321, 322: First and second connection part | P1: Discharge path |
| P2, P3, P4: Auxiliary discharge path | W, W1, W2: Width |

DETAILED DESCRIPTION

The present invention will be described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
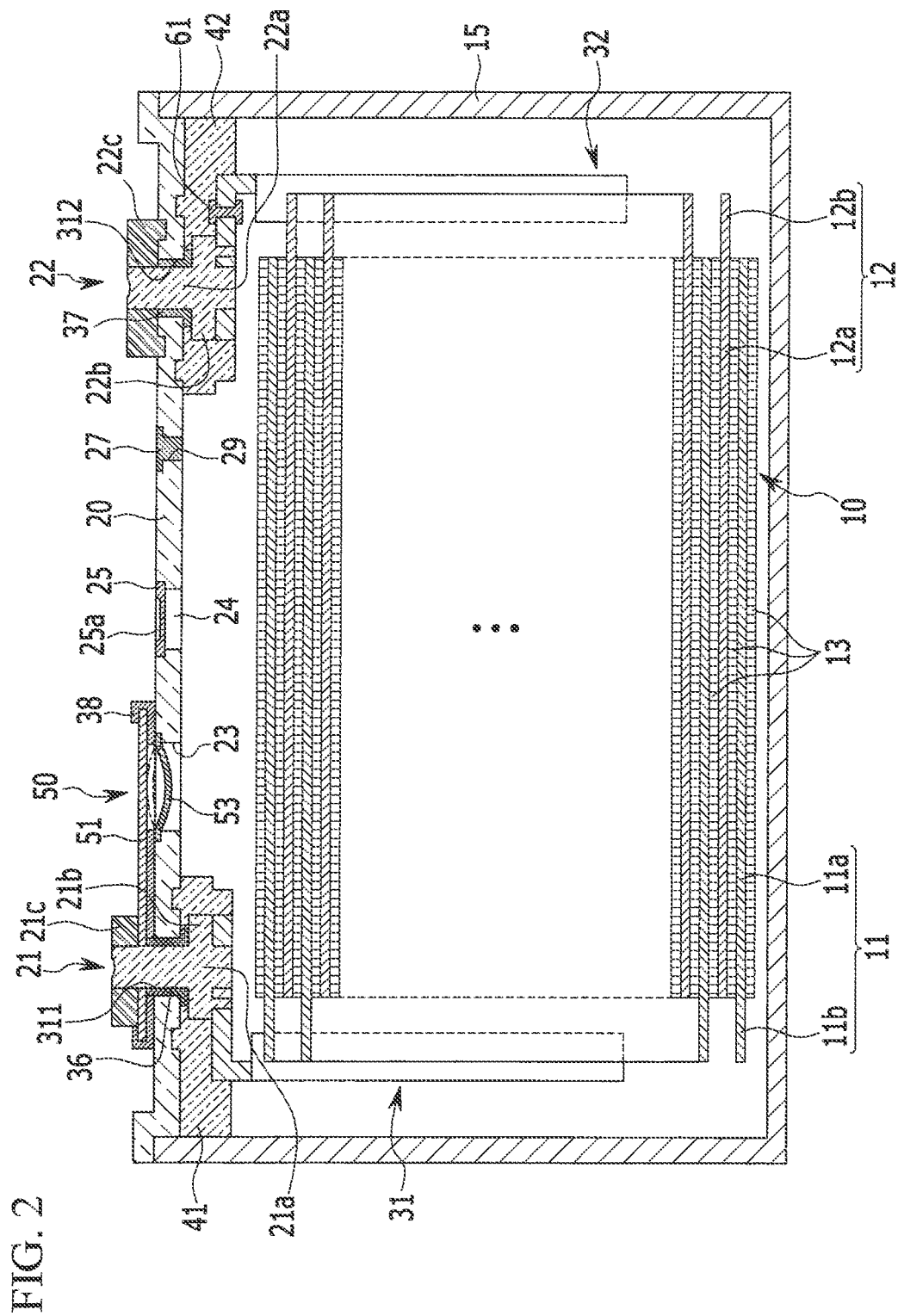
FIG. 2 is a cross-sectional view of the rechargeable battery of FIG. 1, taken along the line II-II.

FIG. 1 is a perspective view of a rechargeable battery according to an exemplary embodiment of the present invention, and FIG. 2 is a cross-sectional view of the rechargeable battery of FIG. 1, taken along the line II-II. Referring to FIGS. 1 and 2, the rechargeable battery according to an exemplary embodiment of the present invention includes an electrode assembly 10 to charge and discharge a current, a case 15 housing the electrode assembly 10, a cap plate 20 covering an opening of the case 15, a first terminal 21 (e.g., a negative electrode terminal) and a second terminal 22 (e.g., a positive electrode terminal) which are installed at the cap plate 20, an external short-circuit part 50 provided at the first terminal 21 side, and a fuse part 60 (see FIG. 3) provided at the second terminal 22 side.

In one embodiment, in the electrode assembly 10, a first electrode 11 (e.g., a negative electrode) and a second electrode 12 (e.g., a positive electrode) are disposed at both sides of a separator 13 as an insulator, and the first electrode 11, the separator 13, and the second electrode 12 are wound in a jelly roll shape.

Further, the electrode assembly 10 may be assembled by laminating the negative electrode and the positive electrode which are formed as a single plate with the separator interposed therebetween or by folding and laminating the negative electrode, the separator, and the positive electrode in a zigzag manner (not shown).

The first electrode 11 and the second electrode 12 include coated regions 11a and 12a formed by coating active materials on a current collector of a metal plate, and uncoated regions 11b and 12b formed by an exposed current collector on which the active materials are not coated.

In one embodiment, the uncoated region 11b of the first electrode 11 is formed at one end of the first electrode 11 along the wound first electrode 11, and the uncoated region 12b of the second electrode 12 is formed at one end of the second electrode 12 along the wound second electrode 12, such that the uncoated regions 11b and 12b are disposed at both ends of the electrode assembly 10, respectively.

In one embodiment, the case 15 is formed having a substantially cuboid shape and has an inner space housing the electrode assembly 10 and an electrolyte solution therein and has an opening connecting the outside with the inner space which is formed on one surface of the cuboid. The opening allows the electrode assembly 10 to be inserted into the inner space of the case 15.

The cap plate 20, in one embodiment, is formed of a thin metal (e.g., steel) plate and installed at the opening of the case 15 to seal the case 15. The cap plate 20, in one embodiment, includes an electrolyte injection opening 29 and a vent hole 24.

The electrolyte injection opening 29 allows an electrolyte to be injected into the case 15 after connecting the cap plate 20 to the case 15. After injecting the electrolyte, the electrolyte injection opening 29 is sealed with a sealing cap 27.

The vent hole 24 is sealed with a vent plate 25 to discharge an internal pressure of the rechargeable battery. When the internal pressure of the rechargeable battery reaches a certain pressure (e.g., a predetermined pressure), the vent plate 25 is broken or ruptured to open the vent hole 24. The vent plate 25, in one embodiment, has a notch 25a to induce the breaking or rupturing.

The first terminal 21 and the second terminal 22, in one embodiment, are installed by passing through the cap plate 20 and are electrically connected to the electrode assembly 10. In one embodiment, the first terminal 21 (e.g., a negative terminal) is electrically connected to the first electrode 11 (e.g., a negative electrode) of the electrode assembly 10, and the second terminal 22 (e.g., a positive electrode) is electrically connected to the second electrode 12 (e.g., a positive electrode) of the electrode assembly 10. Accordingly, the electrode assembly 10 is drawn out to the outside of the case 15 through the first terminal 21 and the second terminal 22.

In one embodiment, the first terminal 21 and the second terminal 22 have the same structure as each other at the inside of the cap plate 20, and the same structure is therefore described together herein, and outside of the cap plate 20, the first terminal 21 and the second terminal 22 have different structures from each other, and the different structures will be separately described.

In one embodiment, the first and second terminals 21 and 22 include rivet terminals 21a and 22a installed at terminal holes 311 and 312 of the cap plate 20, respectively, flanges 21b and 22b widely formed and integral with the rivet terminals 21a and 22a at the inside of the cap plate 20, and plate terminals 21c and 22c disposed at the outside of the cap plate 20 to be connected to the rivet terminals 21a and 22a, such as by riveting or welding.

First and second gaskets 36 and 37 are installed between the rivet terminals 21a and 22a of the first and second terminals 21 and 22 and the inner surfaces of the terminal holes 311 and 312 of the cap plate 20, respectively, to seal between the rivet terminals 21a and 22a of the first and second terminals 21 and 22 and the cap plate 20. The first and second gaskets 36 and 37, in one embodiment, further extend between the flanges 21b and 22b and the inner surface of the cap plate 20 to further seal between the flanges 21b and 22b and the cap plate 20. That is, the first and second gaskets 36 and 37 are installed between the first and second terminals 21 and 22 and the cap plate 20, thereby preventing or substantially preventing the electrolyte solution from leaking through the terminal holes 311 and 312.

Figure 3:
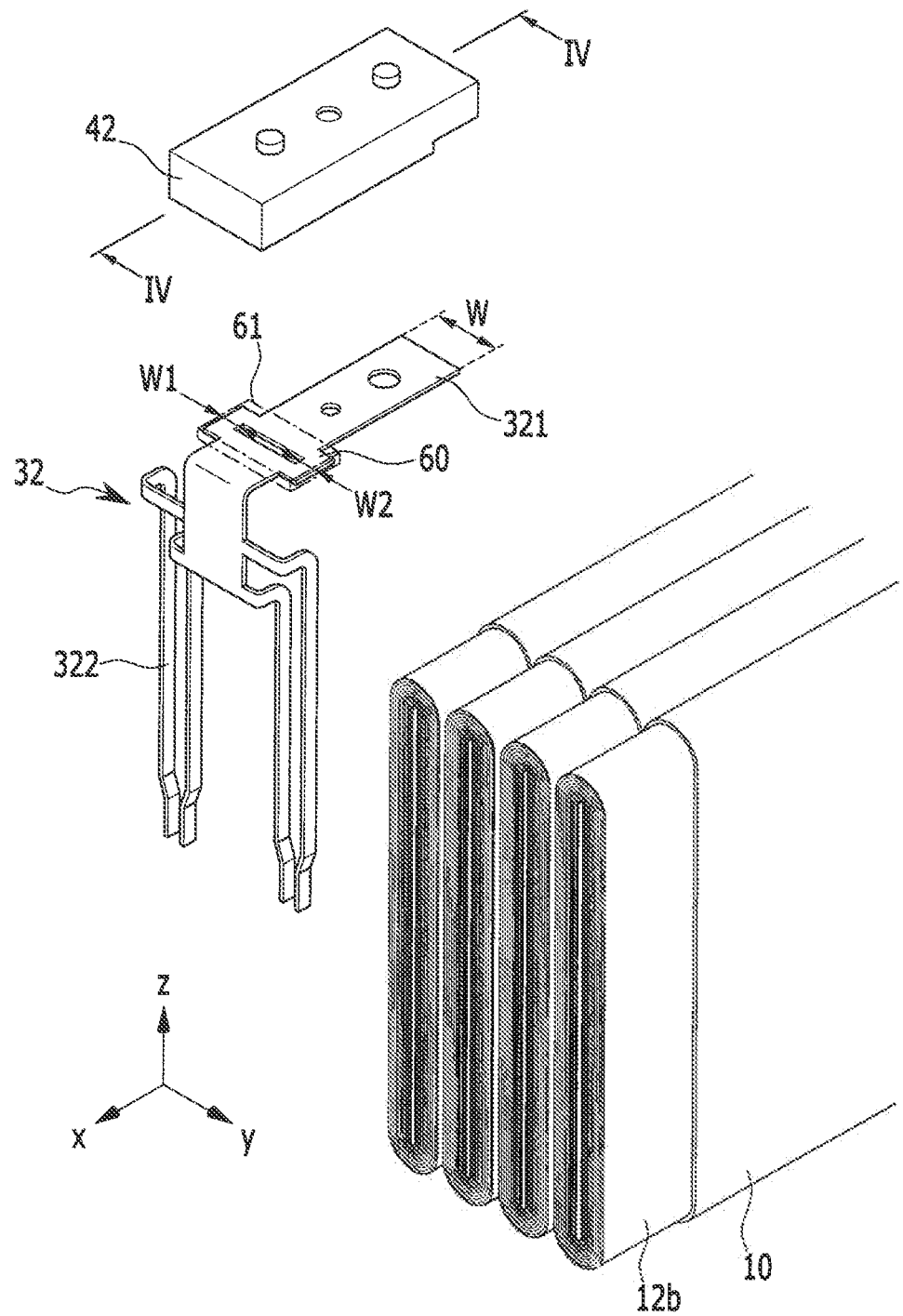
FIG. 3 is a partial exploded perspective view of the rechargeable battery of FIG. 1.

In one embodiment, the rechargeable battery includes a plurality of electrode assemblies 10 (see FIG. 3). In the electrode assemblies 10, the first electrodes 11 are electrically connected to each other by a first electrode lead tab 31 (e.g., a negative electrode lead tab) and the second electrodes 12 are electrically connected to each other by a second electrode lead tab 32 (e.g., a positive electrode lead tab). Although not shown, the present invention may also be applied to a rechargeable battery having one electrode assembly.

The first and second electrode lead tabs 31 and 32 electrically connect the first and second terminals 21 and 22 to the first and second electrodes 11 and 12 of the electrode assembly 10, respectively. In one embodiment, the first and second electrode lead tabs 31 and 32 are connected to lower ends of the rivet terminals 21a and 22a to caulk the lower ends, such that the first and second electrode lead tabs 31 and 32 are supported by the flanges 21b and 22b and connected to the lower ends of the rivet terminals 21a and 22a.

First and second insulation members 41 and 42 are installed between the first and second electrode lead tabs 31 and 32, respectively, and the cap plate 20 to electrically insulate the first and second electrode lead tabs 31 and 32 and the cap plate 20. In one embodiment, one side of each of the first and second insulation members 41 and 42 is connected to the cap plate 20 and the other side thereof surrounds the respective first or second electrode lead tab 31 or 32, the rivet terminal 21a or 22a, and the flange 21b or 22b, thereby stabilizing the connection structure thereof.

An external short-circuit part 50 is described below with reference to the plate terminal 21c. Referring to FIG. 2, the external short-circuit part 50 includes a short-circuit tab 51 and a short-circuit member 53 which are either separated from each other or short circuited, depending on an internal pressure in the case 15.

In one embodiment, the short-circuit tab 51 is electrically connected to the rivet terminal 21a of the first terminal 21 (e.g., the negative terminal) and disposed at the outside of the cap plate 20 with an insulation member 38 interposed therebetween. The insulation member 38 is installed between the short-circuit tab 51 and the cap plate 20 to electrically insulate the short-circuit tab 51 and the cap plate 20 from each other. That is, the cap plate 20 is electrically insulated from the first terminal 21.

In one embodiment, the short-circuit tab 51 and the terminal plate 21c are connected to an upper end of the rivet terminal 21a to caulk the upper end, such that the short-circuit tab 51 and the terminal plate 21c are connected to the upper end of the rivet terminal 21a. Accordingly, the short-circuit tab 51 and the terminal plate 21c are fixedly supported to the cap plate 20 with the insulation member 38 interposed therebetween.

The short-circuit member 53 is installed in a short-circuit hole 23 of the cap plate 20. The short-circuit tab 51 is connected to the first terminal 21 and extends toward the short-circuit member 53. The short-circuit tab 51 and the short-circuit member 53 face each other in the short-circuit hole 23 in either a separated state (depicted by solid line in FIG. 2) or a short-circuited state (depicted by dashed line in FIG. 2).

When the internal pressure of the rechargeable battery increases (e.g., exceeds a predetermined pressure), the short-circuit member 53 is modified from the separated state to the short-circuited state to be contacted to the short-circuit tab 51. In the short-circuited state, the short-circuit tab 51 and the cap plate 20 are electrically connected to each other to maintain the short-circuited state of the electrode assembly 10. In the short circuit, a high-voltage current is rapidly (e.g., instantaneously) discharged between the first and second terminals 21 and 22 through the short-circuit tab 51 and the short-circuit member 53. Also, in the short circuit, a fuse part 60 may be melted and broken, or cut, in a discharge line connecting the electrode assembly 10 and the first and second terminals 21 and 22.

Figure 4:
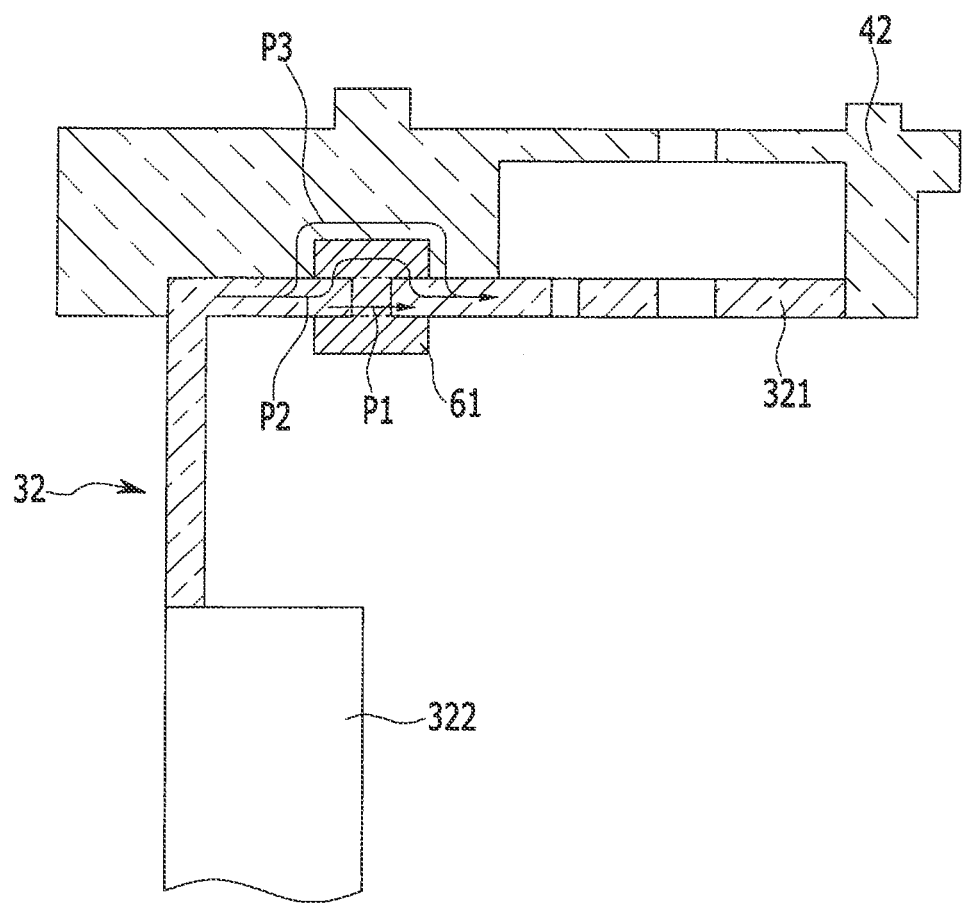
FIG. 4 is a cross-sectional view of a lead tab and an insulation member of the rechargeable battery of FIG. 1, taken along the line IV-IV of FIG. 3.

FIG. 3 is a partial exploded perspective view of the rechargeable battery of FIG. 1, showing the second lead tab 32 and the second insulation member 42, and FIG. 4 is a cross-sectional view of the second lead tab 32 and the second insulation member 42, taken along the line IV-IV of FIG. 3. In one embodiment, FIGS. 3 and 4 show the second lead tab 32 that may be a positive electrode lead tab and the second insulation member 42 that may be a positive insulation member.

Referring to FIGS. 2 to 4, the fuse part 60 is provided at the second terminal 22 (e.g., the positive terminal) side. The fuse part 60 is provided at the second electrode lead tab 32 so as to be melted and broken by discharging the high-voltage current due to the operation of the external short-circuit part 50.

The second electrode lead tab 32, in one embodiment, includes a first connection part 321 connected to the second terminal 22 and a second connection part 322 curved at an end of the first connection part 321 to be connected to the electrode assembly 10. In one embodiment, the fuse part 60 is formed at the first connection part 321 in a structure of increased electrical resistance with widths W1 and W2 smaller than a width W of the first connection part 321 and at both sides of the first connection part 321 in a widthwise direction (i.e. the y-axis direction shown in FIG. 3).

The fuse part 60, in one embodiment, is formed at both sides of the first connection part 321 in the widthwise direction, thereby decreasing a reduction of mechanical strength of the first and second connection parts 321 and 322 due to the formation of the fuse part 60.

The fuse part 60 forms a discharge path (P1) when the rechargeable battery is normally driven, and the rechargeable battery according to an exemplary embodiment of the present invention further forms an auxiliary discharge path (P2) discharging the high-voltage current when the fuse part 60 is melted and broken by the external short circuit.

In one embodiment, the auxiliary discharge path (P2) forms an insulation structure when the rechargeable battery is normally driven and forms an electric-conduction structure when the fuse part 60 is melted and broken. The fuse part 60 has a low first electrical resistance value, and the auxiliary discharge path (P2) has a second electrical resistance value greater than the first electrical resistance value.

According to one exemplary embodiment, the auxiliary discharge path (P2) is formed by an insert injection part 61 formed by insert-injecting the fuse part 60 of the second electrode lead tab 32. When the fuse part 60 is in a normal state, the current is blocked by high electrical resistance of the insert injection part 61, and the normal current is discharged through the fuse part 60 (P1).

However, when the fuse part 60 is melted and broken, then the high-voltage current flows, in spite of the high electrical resistance of the insert injection part 61, and the high-voltage current is discharged through the insert injection part 61 along the auxiliary discharge path (P2). Accordingly, an arc does not occur in the broken, or cut, portion of the fuse part 60. As such, a rechargeable battery according to embodiments of the present invention is particularly suited for application in an electric vehicle or a hybrid electric vehicle.

In one embodiment, auxiliary discharge paths (P2) and (P3) may be formed by the insert injection part 61 formed by insert-injecting the fuse part 60 of the second electrode lead tab 32 and the second insulation member 42 insulation-supporting the first connection part 321 of the second electrode lead tab 32. When the fuse part 60 is in a normal state, the current is blocked by high electrical resistance of the insert injection part 61 and the second insulation member 42, and the normal current is discharged through the fuse part 60 along the discharge path (P1).

However, when the fuse part 60 is melted and broken, then the high-voltage current flows, in spite of the high electrical resistance of the insert injection part 61 and the second insulation member 42, and the high-voltage current is discharged through the insert injection part 61 and the second insulation member 42 along auxiliary discharge paths (P2) and (P3). Accordingly, an arc does not occur in the broken, or cut, portion of the fuse part 60. A difference in the high-voltage current amounts flowing into the auxiliary discharge paths (P2) and (P3) may occur according to the electrical resistance values of the insert injection part 61 and the second insulation member 42, and, in one embodiment, the insert injection part 61 and the second insulation member 42 may have the same electrical resistance value.

In one embodiment, for example, the insert injection part 61, or both the insert injection part 61 and the second insulation member 42, may be formed of polypropylene (PP) of 70 to 90 wt % and carbon of 10 to 30 wt %, or may be formed of polyphenylenesulfide (PPS) of 70 to 90 wt % and carbon of 10 to 30 wt %.

Polypropylene and polyphenylenesulfide provide an insulation property to the insert injection part 61 and the second insulation member 42 to increase an electrical resistance value according to an increase in the content thereof, and carbon provides an electric-conduction property to the insert injection part 61 and the second insulation member 42 to decrease the electrical resistance value according to an increase in the content thereof.

In one embodiment, the insert injection part 61 and the second insulation member 42 have an electrical resistivity of 10 to $1*10^6$ ohm*cm, such that the insert injection part 61 and the second insulation member 42 having the second electrical resistance value function as an insulation member for the discharge current when the rechargeable battery is normally driven and function as a conductive member for the high-voltage discharge current.

When the electrical resistivity is less than 10 ohm*cm, the insert injection part or the second insulation member malfunctions as a conductive member for the normal current according to a change in a use environment when the rechargeable battery is normally driven, thereby externally short circuiting the rechargeable battery.

Further, when the electrical resistivity is greater than $1*10^6$ ohm*cm, the insert injection part or the second insulation member malfunctions as an insulation member even for the high-voltage current when the rechargeable battery is externally short circuited, such that the high-voltage current may not be discharged.

Various other exemplary embodiments of the present invention are described below, in which repeated description of components, features, and configurations which are the same as shown and described above with respect to the above-described exemplary embodiment is omitted. In the exemplary embodiment shown and described above, the auxiliary discharge path (P2) is formed by the insert injection part 61, and the auxiliary discharge path (P3) is formed by the second insulation member 42.

Figure 5:
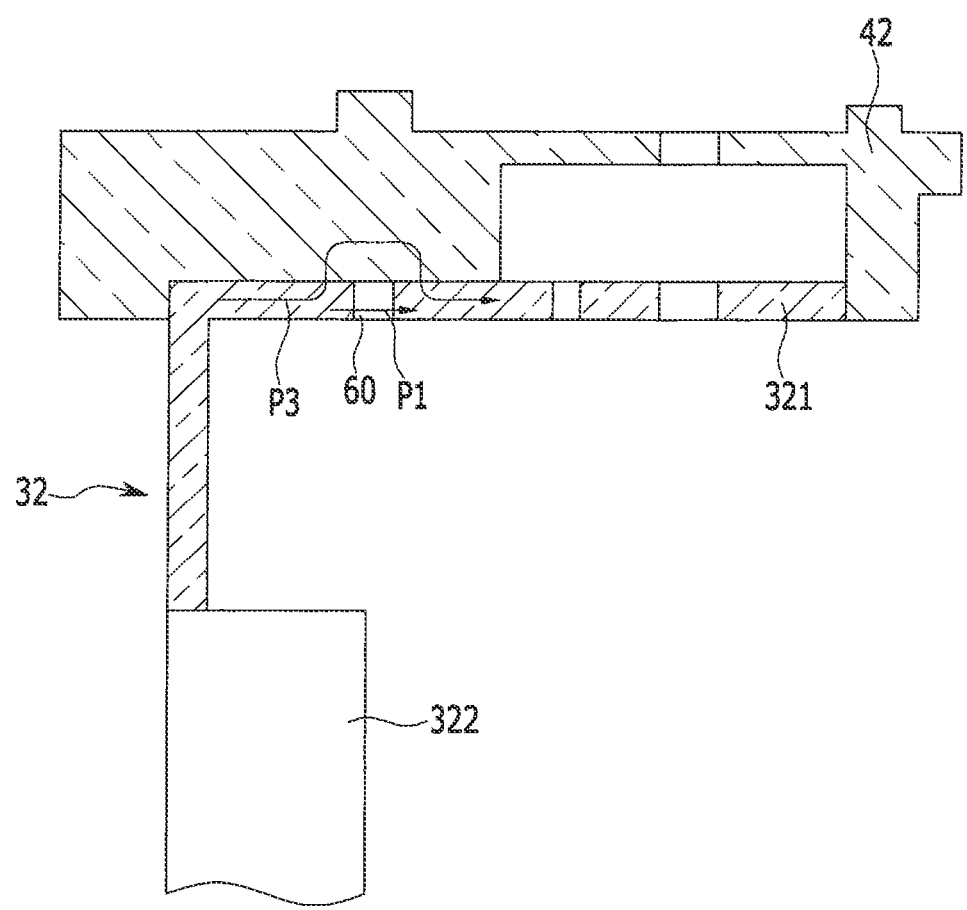
FIG. 5 is a cross-sectional view of a lead tab and an insulation member of a rechargeable battery according to another exemplary embodiment of the present invention.

FIG. 5 is a cross-sectional view of a lead tab and an insulation member of a rechargeable battery according to another exemplary embodiment of the present invention. Referring to FIG. 5, the auxiliary discharge path (P3) is formed by the second insulation member 42 housing and supporting the fuse part 60 of the second lead tab 32, but the insert injection part 61 and the auxiliary discharge path (P2) formed thereby are not present. When the fuse part 60 is in a normal state, the current is blocked by high electrical resistance of the second insulation member 42 and the normal current is discharged through the fuse part 60 along the discharge path (P1).

However, when the fuse part 60 is melted and broken, then the high-voltage current flows, in spite of the high electrical resistance of the second insulation member 42, and the high-voltage current is discharged through the second insulation member 42 along the auxiliary discharge path (P3). Accordingly, an arc does not occur in the broken, or cut, portion of the fuse part 60.

Figure 6:
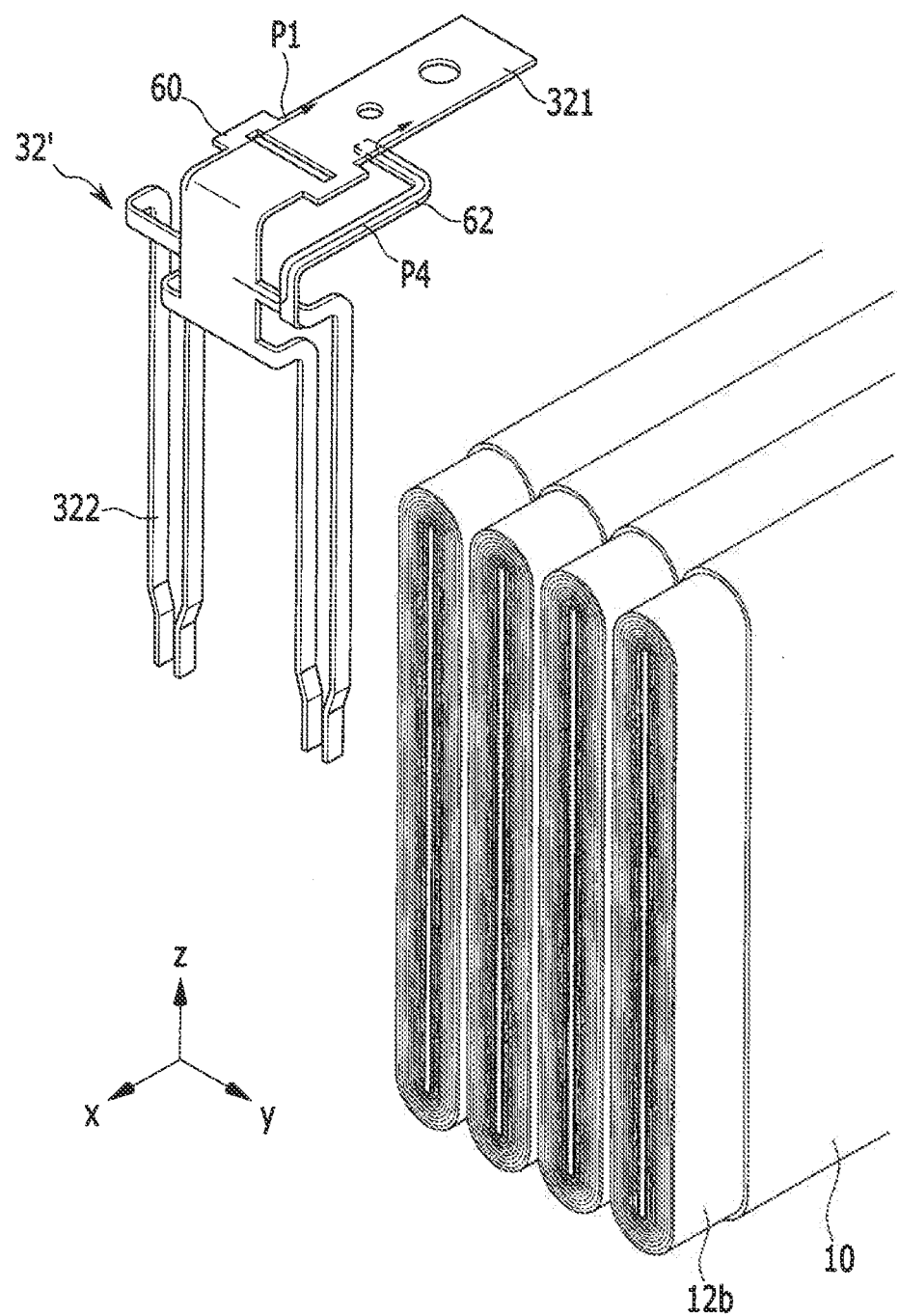
FIG. 6 is a perspective view showing a lead tab of a rechargeable battery according to another exemplary embodiment of the present invention.

FIG. 6 is a perspective view showing a lead tab of a rechargeable battery according to another exemplary embodiment of the present invention. Referring to FIG. 6, an auxiliary discharge path (P4) has a second electrical resistance value and is formed by a connection member 62 connecting both sides (i.e. opposite sides) of the fuse part 60 of a lead tab 32' (e.g., a positive electrode lead tab). One end of the connection member 62 may be connected (e.g., welded or caulked) and curved at a lower surface of the first connection part 321 and the other end of the connection member 62 may be connected (e.g., welded or caulked) at a side surface of the second connection part 322.

In one embodiment, the lead tab 32' may be made of a material, such as aluminum or copper, having relatively low electrical resistance, and the connection member 62 may be made of a material, such as stainless steel, having relatively high electrical resistance. When the fuse part 60 is in a normal state, the current is blocked by the high electrical resistance of the connection member 62, and the normal current is discharged through the fuse part 60 along the discharge path (P1).

However, when the fuse part 60 is melted and broken, then the high-voltage current flows, in spite of the high electrical resistance of the connection member 62, and the high-voltage current is discharged through the connection member 62 along the auxiliary discharge path (P4). Accordingly, an arc does not occur in the broken, or cut, portion of the fuse part 60.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly comprising a first electrode, a second electrode, and a separator between the first and second electrodes;
   a case housing the electrode assembly;
   a cap plate covering an opening of the case;
   an electrode terminal extending through the cap plate;
   a lead tab connecting the electrode terminal and the electrode assembly and including a fuse part between the electrode assembly and the electrode terminal, the fuse part defining a first discharge path therethrough; and
   an auxiliary discharge path between the electrode assembly and the electrode terminal and between opposite sides of the fuse part and having a second electrical resistance value greater than a first electrical resistance value of the first discharge path of the fuse part,
   wherein the fuse part is configured to break and disconnect the first discharge path when the rechargeable battery is in a short-circuited state such that current is passed between the electrode assembly and the electrode terminal through the auxiliary discharge path.

2. The rechargeable battery of claim 1, wherein the auxiliary discharge path is configured to electrically insulate between the opposite sides of the fuse part when the rechargeable battery is in a normal state and electrically conduct between the opposite sides of the fuse part when the rechargeable battery is in the short-circuited state.

3. The rechargeable battery of claim 1,
   wherein the lead tab includes a first connection part connected to the electrode terminal, and a second connection part connected to the electrode assembly, and
   wherein the fuse part is at the first connection part.

4. The rechargeable battery of claim 1, wherein the auxiliary discharge path is formed by an insert injection part formed by insert-injecting the fuse part of the lead tab.

5. The rechargeable battery of claim 4, wherein the auxiliary discharge path is further formed by an insulation member insulating the insert injection part and the lead tab from an inner surface of the cap plate.

6. The rechargeable battery of claim 5, wherein at least one of the insert injection part and the insulation member is formed of polypropylene (PP) of 70 to 90 wt % and carbon of 10 to 30 wt %.

7. The rechargeable battery of claim 5, wherein at least one of the insert injection part and the insulation member is formed of polyphenylenesulfide (PPS) of 70 to 90 wt % and carbon of 10 to 30 wt %.

8. The rechargeable battery of claim 1, wherein the auxiliary discharge path is formed by an insulation member insulating the lead tab from an inner surface of the cap plate.

9. The rechargeable battery of claim 1, wherein the auxiliary discharge path is formed of a material having an electrical resistivity of 10 to $1*10^6$ ohm*cm.

10. The rechargeable battery of claim 1, wherein the auxiliary discharge path is formed by a connection member connecting the opposite sides of the fuse part of the lead tab.

11. The rechargeable battery of claim 10, wherein the lead tab is made of aluminum or copper, and the connection member is made of stainless steel.

12. The rechargeable battery of claim 1,
    wherein the electrode terminal comprises a negative terminal installed in an insulation structure at the cap plate, and a positive terminal installed in an electric-conduction structure at the cap plate, and
    wherein the fuse part is formed at the lead tab connected to the positive terminal.

13. The rechargeable battery of claim 12, wherein the auxiliary discharge path connects the opposite sides of the fuse part to the positive terminal.

14. The rechargeable battery of claim 1, wherein the rechargeable battery is adapted for use as a motor-driving power source for propelling an electric vehicle or a hybrid electric vehicle.

* * * * *